United States Patent [19]

Phipps

[11] 4,247,276
[45] Jan. 27, 1981

[54] VACUUM EXTRUSION APPARATUS FOR FORMING FOAMED PLASTIC PRODUCTS

[75] Inventor: Arthur L. Phipps, Los Osos, Calif.

[73] Assignee: Condec Corporation, Old Greenwich, Conn.

[21] Appl. No.: 69,827

[22] Filed: Aug. 27, 1979

[51] Int. Cl.³ .................. B29F 3/04; B29D 27/00
[52] U.S. Cl. ............................ 425/325; 264/51; 264/101; 264/177 R; 425/466; 425/817 C; 425/DIG. 60
[58] Field of Search ............. 264/51, 209, 101, 102, 264/177 R; 425/817 R, 4 C, 325, 466, DIG. 60 C

[56] References Cited

U.S. PATENT DOCUMENTS

| | | | |
|---|---|---|---|
| 2,007,389 | 7/1935 | Taylor et al. | 264/101 X |
| 3,169,272 | 2/1965 | Maxson | 264/209 X |
| 3,311,678 | 3/1967 | Brock et al. | 264/102 X |
| 3,704,083 | 11/1972 | Phipps | 264/51 X |
| 3,822,331 | 7/1974 | Cogliano | 264/101 X |
| 4,044,084 | 8/1977 | Phipps | 264/51 |

FOREIGN PATENT DOCUMENTS 1233088  5/1971  United Kingdom ............ 264/101

*Primary Examiner*—Philip Anderson
*Attorney, Agent, or Firm*—Maky, Renner, Otto & Boisselle

[57] ABSTRACT

A foam extrusion apparatus employs one or more extruders mounted on horizontal rails for movement toward and away from the end of a vacuum chamber which is in the form of an elongated inclined barometric leg. The upper end of the chamber is closed by two, substantially concentric in the closed position, substantial bulkheads, each also supported on rails and held in an inclined position to close the upper end of the chamber when moved; one against the chamber and the other against the one. A die is positioned on the inside of the other or smaller bulkhead and aligned with the leg when closed. The extruders are connected to the die through a length of pipe extending through the smaller bulkhead and sealed by a bellows. A shaping mechanism is supported on the interior of the one or larger bulkhead surrounding the die when both bulkheads close the upper end of the inclined barometric leg or vacuum chamber. The die is adjustable externally of the bulkhead. The extruders, die and bulkheads are movable as a unit or separately toward and away from each other to provide access to the die, to the shaping mechanism, and to the interior of the chamber.

31 Claims, 5 Drawing Figures

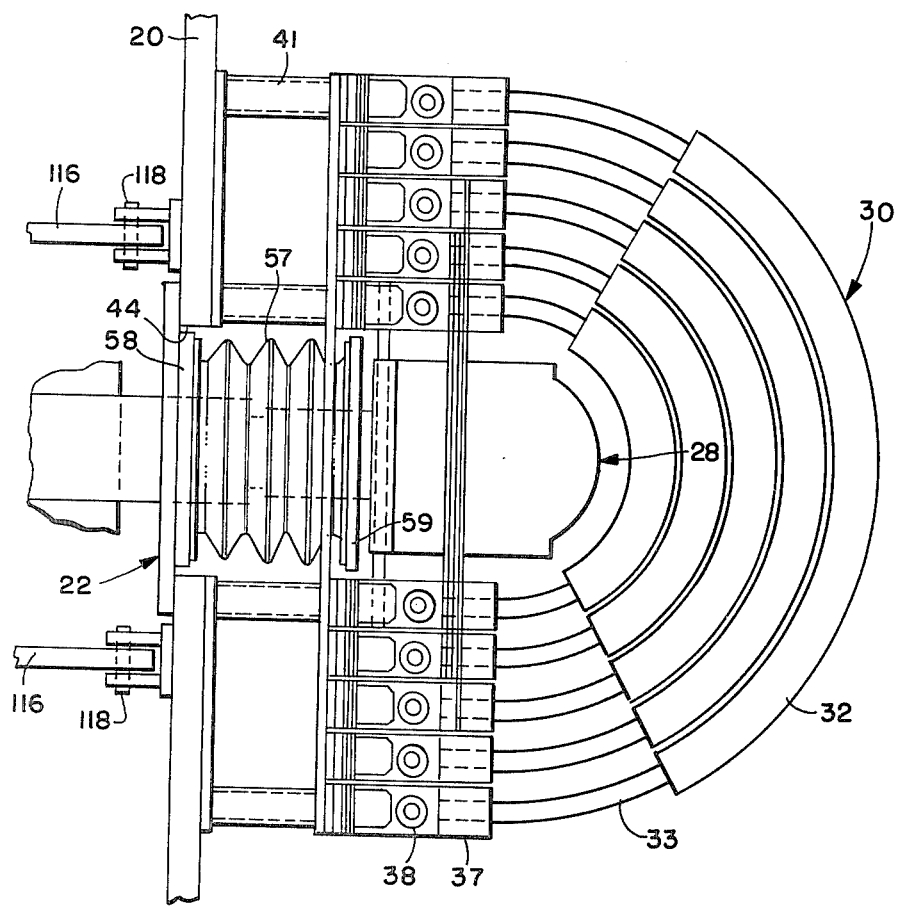
_FIG. 2_
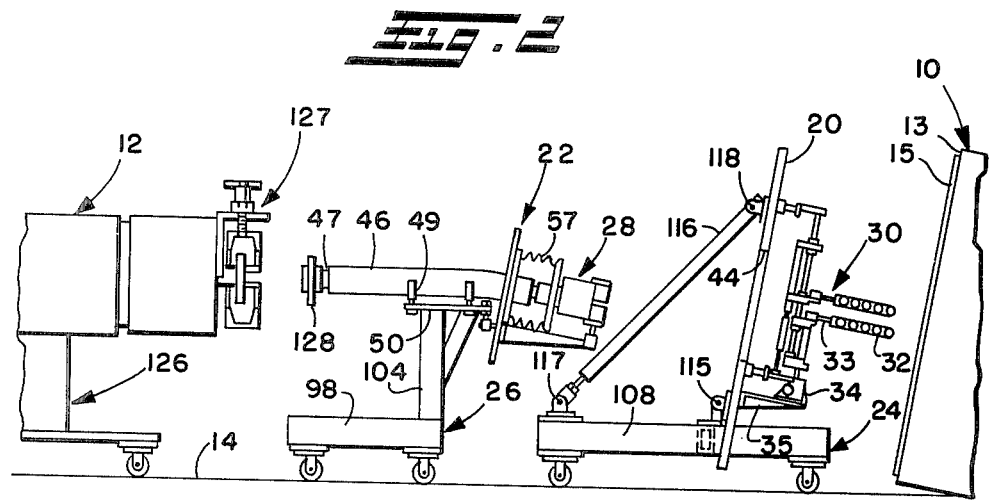
_FIG. 3_

VACUUM EXTRUSION APPARATUS FOR FORMING FOAMED PLASTIC PRODUCTS

This invention relates generally as indicated to a foam extrusion apparatus and method and more particularly to the vacuum extrusion of foam boards, billets or other foam products, which includes a vacuum chamber, closures for the chamber having the extruders on one side and the die and shaping mechanism for the extrudate on the opposite side, the extruders and closures supporting the die and shaping mechanism, respectively, being movable as a unit or separately toward and away from the chamber.

BACKGROUND OF THE INVENTION

This invention is an improvement over the foam extrusion apparatus shown and described in applicant's co-pending application Ser. No. 922,542 filed July 10, 1978 entitled "Foam Extrusion Apparatus and Method". In such application there is disclosed a combination of a vacuum chamber, a closure for the chamber having the extruders on one side and the die on the opposite side, the extruder, closure and die being movable as a unit or separately toward and away from the chamber.

However, when a complex shaper is employed surrounding the die the mounting of the die as aforesaid still does not permit access to the die for adjustment, clean out, and other purposes. The same is true of the shaper. The juxtaposition of the two components, i.e. the die and the shaper, make access to one or the other difficult.

SUMMARY OF THE INVENTION

In accordance with the present invention there is provided an elongated vacuum chamber having an end face which is normal to the axis of the chamber. A closure for the end face in the form of two concentric substantial bulkheads support respectively the die for the extrusion line and a shaper therefor. An extruder is connected to the die through the smaller inner closure while the shaper is supported on the interior of the larger outer closure. In this manner that is provided an end closure for the chamber which comprises a first larger plate adapted to engage the end of the chamber and a second smaller separable plate which is adapted to engage the first plate. The shaper is supported on the interior of the vacuum chamber side of the first plate while the die is supported on the interior or the vacuum chamber side of the second plate. Both plates are individually supported on separate carriages as are the extruder or extruders. Both plates may be interconnected and the inner plate with the extruder may also be connected so that both plates, with the die and shaper supported therefrom may be moved together with the extruder, or each may be moved separably.

It is accordingly a principal object of the present invention to provide a foam extrusion line which includes a vacuum chamber and an extruder with a closure for the vacuum chamber, the closure comprising separable plates supporting a die and shaper, respectively.

Another important object is the provision of apparatus for extruding foamable material utilizing a vacuum chamber which has a multi-part end closure, the various parts of the end closure supporting respective components of the process and apparatus within the chamber.

Still another important object is the provision of apparatus wherein the various parts of the end closure are movable toward and away from the vacuum chamber conjointly or separably.

A further important object is the provision of such multi-part closure for a vacuum chamber wherein the respective parts on the interior thereof support components of the extrusion process and apparatus.

Still another object is the provision of such closure wherein the parts are concentric in the closed position and the components are a die and shaper mechanism.

Still another object is the provision of such closure wherein the various parts of the closure are mounted on nesting carriages which permit the closure to be moved as a whole or separably toward and away from the vacuum chamber.

Yet another object is the provision of an improved end closure for a vacuum chamber permitting the components more quickly and easily to be assembled and disassembled and also permitting the die more closely to be adjusted externally of the chamber.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

In said annexed drawings:

FIG. 2 is a substantially horizontal section taken on the line 2—2 of FIG. 1 illustrating the two parts of the end closure and the shaper and die mounted on the respective parts in assembled position;

FIG. 5 is a fragmentary reduced side elevation showing the chamber opened and illustrating the extruder, the inner end closure, and the outer end closure on their respective carriages and axially separated for access to the components.

DESCRIPTION OF THE PREFERRED EMBODIMENT

Figure 1:
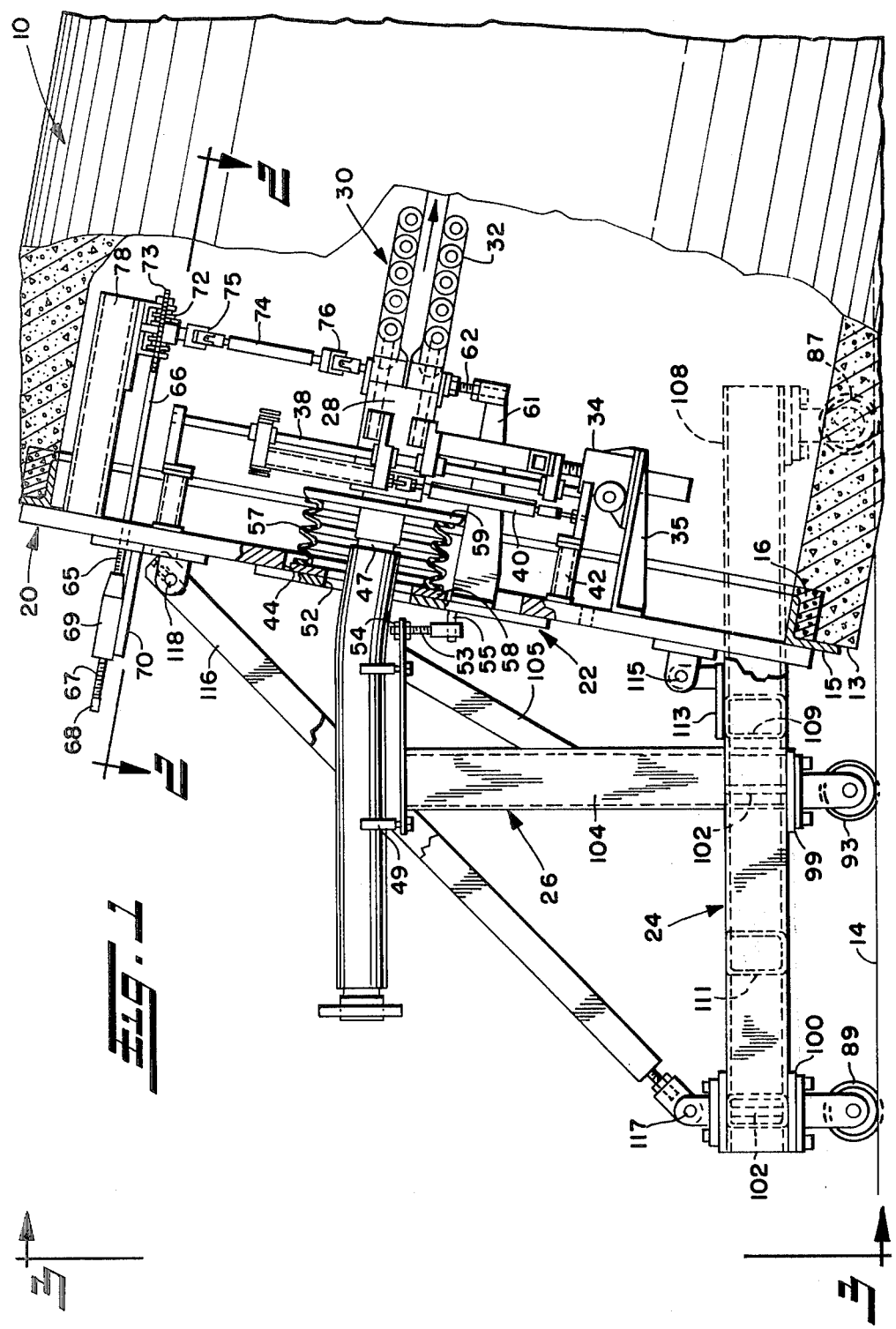
FIG. 1 is a fragmentary side elevation partially broken away and in section of the end closure for the vacuum chamber in position closing the vacuum chamber and positioning the components supported by the parts of the end closure in the proper position both with respect to the vacuum chamber and to each other.

Referring now to the drawings and more particularly to FIGS. 1 and 5, there is illustrated a vacuum chamber shown generally at 10 and an extruder system shown generally at 12 (see FIG. 5). As noted in applicant's aforementioned application, the portion of the vacuum chamber shown may be the upper end of a substantially elongated barometric leg which is of substantial length and extends from a pool of water at its lower end to an upper elevated end with the end 13 thereof projecting slightly above and at an angle to elevated floor 14. As seen in FIG. 1, the upper end of the vacuum chamber may be provided with an angle ring 15 grouted in place as seen at 16 to the endmost face of the concrete sections forming the chamber 10.

The end closure for the vacuum chamber 10 comprises two generally concentric annular plates seen at 20 and 22 which are supported on respective carriages 24 and 26. The plates are supported by the respective carriages to be parallel to each other and also parallel to the bearing angle ring 15 on the end of the vacuum chamber 10.

The inner or smaller end closure 22 supports on one side an extrusion die seen at 28 while the larger end closure 20 supports on the same side a shaper 30. The shaper comprises a series of top and bottom power driven segmented arcuate rolls 32 which are mounted on arcuate shafts 33 with the lower set of rolls being vertically adjustable by means of a jack 34 supported by bracket 35 secured to the vacuum chamber side of the annular closure 20.

The shafts of the upper set of rolls are secured to brackets 37 mounted for vertical movement on vertically extending rods 38. The paired ends of the shafts for each of the rolls of the upper set are moved vertically by an air balanced pneumatic piston-cylinder assembly as seen at 40. The vertically extending rods 38 are supported top and bottom by brackets 41 and 42 again secured to the vacuum chamber side of the closure plate or bulkhead 20. Reference may be had to applicant's co-pending application filed Dec. 18, 1978 entitled "Method and Apparatus for Shaping Plastic Foams", Ser. No. 970,377, for a more clear disclosure of the type of shaper which may be employed with the present invention.

As seen more clearly in FIGS. 1, 2, 3 and 5, the larger plate or end closure 20 is provided with a central aperture or hole 44 of substantial size. Such hole is generally centrally located in the plate or end closure 20 and is adapted to be closed by a somewhat smaller circular plate or end closure 22. The plate 22 surrounds the projecting slightly downwardly inclined end of heating jacket 46 surrounding pipe 47 which in the assembled position of the apparatus interconnects the extruder 12 with the die 28. The heating jacket and thus the pipe and plate as well as the die are supported by brackets 49 on the top plate 50 of the carriage 26.

As seen more clearly in FIG. 1, it is noted that the heating jacket 46 extends through a relatively small hole 52 in the plate 22 with the major weight of the plate and the die being supported by adjustable hanger 53 secured to the front end of the plate 50 as seen at 54. The hanger may engage a stud 55 or the like projecting from the plate 22. The hanger may be employed to adjust the angle of inclination of plate 22.

The plate 22 may be sealed with respect to the pipe 47 by a metallic bellows 57 extending between ring 58 secured to the interior of the plate 22 and annular plate 59 welded to the pipe immediately behind the die 28. The bellows as noted in applicant's aforementioned earlier filed co-pending application Ser. No. 922,542 permits limited relative movement between the die and pipe and the bulkhead formed by the two plates 20 and 22.

Also as seen more clearly in FIG. 1, the plate 22 may be provided on the inner or vacuum chamber side with a projecting bracket arm 61 adjustably supporting the underside of the die 28 as seen at 62. This permits the die opening formed by the die lips to be precisely aligned with the attendant shaper, conveyor and like mechanisms in the vacuum chamber.

Also as seen in FIG. 1, the die lips may be adjustable externally of the end closure through the micrometer indices seen at 65 on shafts 66 projecting through the larger plate 20. The ends of such shafts are threaded as indicated at 67 and may be rotated by application of a turning tool to the squared ends 68 thereof. Rotation of such shafts axially moves micrometer sleeves 68 slidably mounted on brackets 70 projecting from the exterior plate 20.

Rotation of the shafts 66 rotates worms 72 which in turn rotate worm wheels 73 on shafts 74 normal to the shafts 66. The shafts 74 include two universal joints seen at 75 and 76 and rotation adjusts the die lips. The worms and worm wheels may be supported from a bracket 78 extending from the interior of the plate 20. In the illustrated embodiment there may be three sets of shafts 66 and 74 each individually micrometer adjusted through the right angle drive illustrated to obtain the desired precision in the die lip adjustment.

Figure 3:
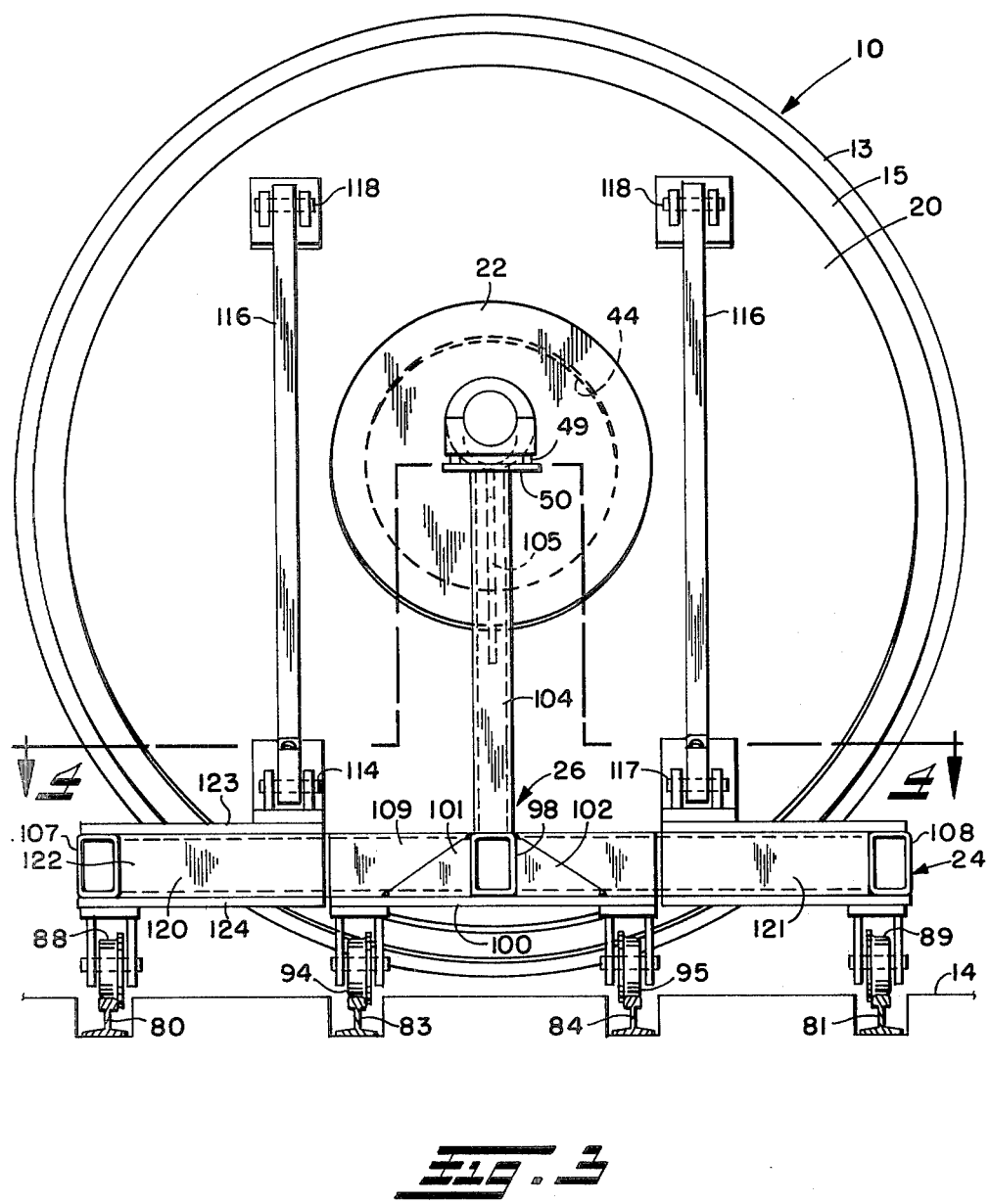
FIG. 3 is an end elevation of the parts of the end closure illustrating the respective carriages therefor as seen from the line 3—3 of FIG. 1.
Figure 4:
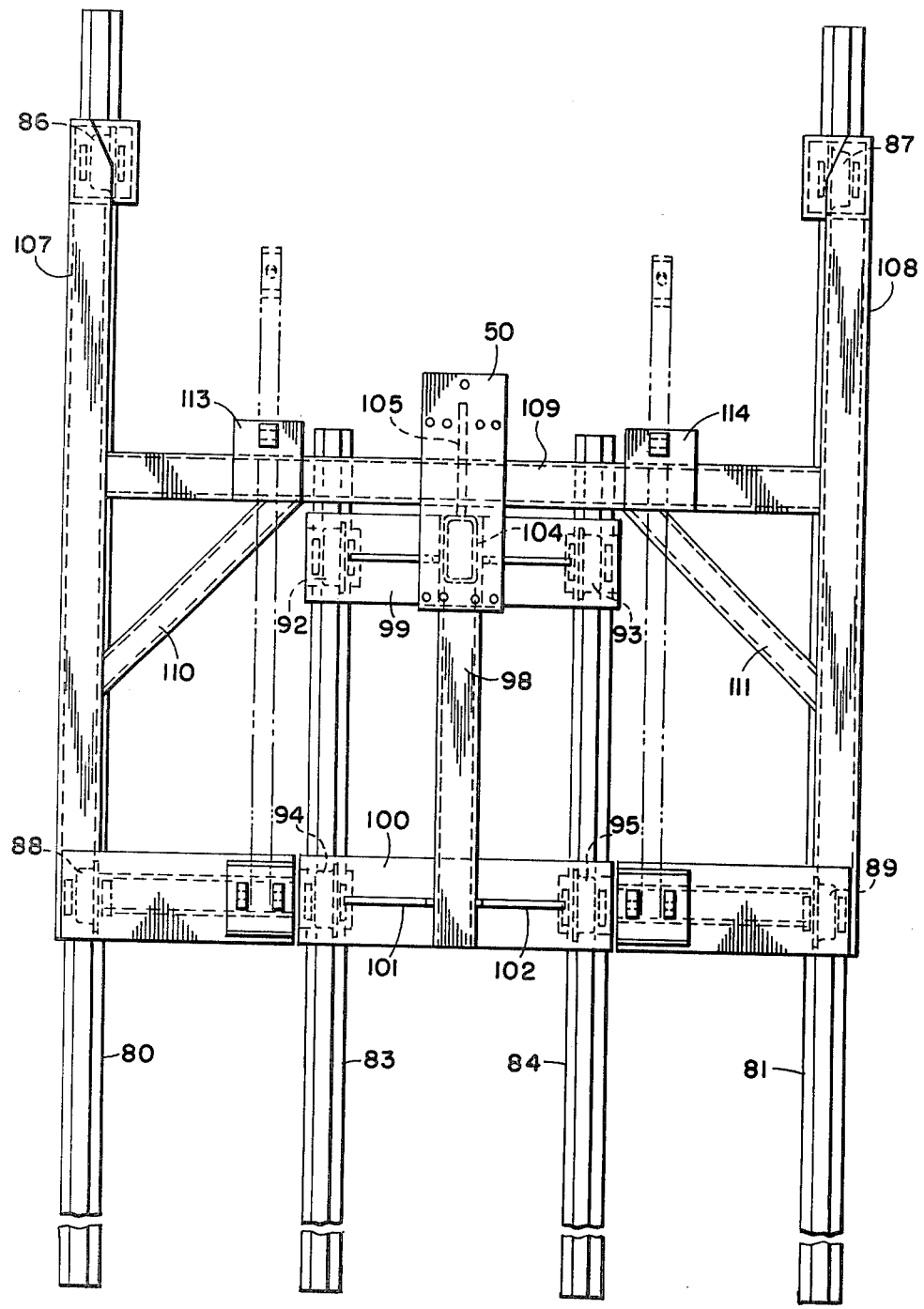
FIG. 4 is a horizontal section taken substantially on the line 4—4 of FIG. 3 again illustrating the carriages and their respective nesting positions when the parts of the end closure are in position closing the end of the vacuum chamber.

Referring now additionally to FIGS. 3 and 4 it will be seen that the carriages 24 and 26 for the plates 20 and 22, respectively, nest together to permit the plates to come together to form the desired complete end closure for the vacuum chamber.

The carriage 24 is mounted on relatively widely spaced rails 80 and 81 while the carriage 26 is mounted on more narrowly spaced rails 83 and 84. The rails may be recessed as seen in FIG. 3 to be flush with the floor 14.

Each carriage is supported on four flanged wheels on the respective rails. The flanged wheels for the larger carriage 24 are seen at 86, 87, 88 and 89 while the four flanged wheels supporting the smaller or inner carriage 26 are seen at 92, 93, 94 and 95.

The frames for the respective carriages are fabricated from rectangular tubular sections with the main base frame of the smaller carriage 26 being in the form of an I with the stem of the I being the frame member 98 extending over and connecting two transverse flat plates 99 and 100. Gussets seen at 101 and 102 interconnect the stem 98 and such flat plates.

Extending upwardly above the forward plate 99 is a stanchion 104 on top of which is secured the plate 50 also supported by forwardly extending brace 105.

The larger carriage 24 includes outboard or side frame members 107 and 108, forming the legs of an H-frame, beneath the ends of which the flanged wheels are supported. Such frame members or legs straddle the upper end of the vacuum chamber when closed. The smaller carriage also nests within such legs. Interconnecting the outboard frames is a single transverse frame 109 stiffened by angle braces 110 and 111. The transverse frame 109 supports hinge pads 113 and 114 from which the plate 20 is pivoted as seen at 115 in FIG. 1.

The angular relationship of the plate 20 to the floor 14 to establish the parallelism with the ring 15 of the vacuum chamber 10 is obtained by adjustable struts 116 pivoted at 117 to the carriage 24 and at 118 to the plate 20. The pivots 117 are supported on inward cantilevered extensions 120 and 121, each of which includes tubular frame members 122 between top and bottom horizontal plates 123 and 124. The plate 20 in this manner is held parallel to the end face of the vacuum chamber 10 and also parallel to the plate 22, both plates extending at a common angle to the floor 14.

As seen more clearly in FIG. 5, the extruder 12 is also mounted on a carriage 126 which may be supported on an extension of the rails as indicated or on its own separate rails. As seen in the first mentioned co-pending application referred to above, a special chain drive may be employed to move the extruder axially of the vacuum chamber or to the right and left as seen in FIG. 5. The extruder includes a removable clamp 127 by which it may be secured to the flange 128 of the pipe 47. Also, threaded fasteners may be employed removably to connect the plate 22 with the plate 20 thus to couple the two plates and their carriages together for movement in unison. Also, compressible seals may be employed between the plates 20 and 22 as well as between the plate 20 and the end 15 of the vacuum chamber.

In normal practice, the components of the apparatus will be assembled prior to movement in unison to the right as seen in FIG. 5 to close the vacuum chamber. This permits the assembly of the universal drive for the adjustment of the die lips before the vacuum chamber is closed. In normal practice, the entire assembly will be removed from the end of the vacuum chamber before disassembling the components as illustrated in FIG. 5, again to permit disassembly of the universal joint drive to the die lips. The disassembly as seen in FIG. 5 readily permits access to the major components of the system for servicing, set-up and adjustment.

It can now be seen that with the present invention there is provided a vacuum extrusion line which includes a vacuum chamber having an end closure formed of separable plates with the plates supporting on the interior or vacuum chamber side thereof major components of the line or system, such components being supported for movement as a unit or separably.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. In a vacuum extrusion combination, a vacuum chamber, an end closure for such chamber adapted to support an extrusion die and a shaper downstream of the die; said end closure comprising a first closure adapted to engage the end of the chamber, and a separable second closure adapted to engage and cooperate with the first closure to close the end of the chamber.

2. The combination set forth in claim 1 including means to support a shaper on said first closure.

3. The combination set forth in claims 1 or 2 including means to support an extrusion die on said second closure.

4. The combination set forth in claim 1 including support means for said closures.

5. The combination set forth in claim 1 including respective support means for said closures.

6. The combination set forth in claim 1 including an extruder, and means releasably to connect said extruder to said extrusion die.

7. The combination set forth in claim 6 including support means for said extruder for movement independently of or in unison with one or both closures.

8. The combination set forth in claim 7 including a pipe extending through said second closure, means to connect said extruder to said pipe, and an extrusion die mounted on said pipe on the opposite side of the closure as the extruder connection.

9. The combination set forth in claim 1 including carriages for each closure, said carriages being capable of nesting one within the other.

10. The combination set forth in claim 9 wherein the carriage for said first closure includes an H-frame base, the H-frame including legs.

11. The combination set forth in claim 10 wherein the legs of the H-frame are adapted to straddle the vacuum chamber in the position of the first closure engaging the end of the chamber.

12. The combination set forth in claim 10 wherein the carriage for the second closure nests between the legs of the H when the second closure engages the first.

13. The combination set forth in claim 10 wherein the carriage of the second closure includes an I-frame base.

14. The combination set forth in claim 1 including a hole in said first closure, said second closure being adapted to close the hole in said first closure.

15. The combination set forth in claim 14 wherein said first closure is inclined, and said second closure has an inclined extrusion die mounted thereon, said hole being of sufficient size to pass the inclined die therethrough.

16. The combination set forth in claim 15 including a shaper mounted on said first closure, said die being aligned with said shaper when said second closure closes the hole in said first closure.

17. The combination set forth in claim 1 including carriages for each closure, and means to support each closure from its respective carriage at a common angle.

18. The combination set forth in claim 15 wherein each carriage includes means to adjust said angle.

19. The combination set forth in claim 1 including a shaper and an extrusion die mounted on a common side of said first and second closures.

20. The combination set forth in claim 19 including die adjustment means extending through said first closure.

21. The combination set forth in claim 20 including a right angle drive for said die adjustment means.

22. The combination set forth in claim 21 wherein said right angle drive includes a worm gear and wheel. m 23. The combination set forth in claim 22 including micrometer adjustment means on said die adjustment on the exterior of said first closure.

24. In a vacuum extrusion line, a vacuum chamber, separable closures forming an end closure for said chamber, said closures supporting on the interior thereof an extrusion die and shaper, respectively.

25. An extrusion line as set forth in claim 24 including respective carriages for said closures.

26. An extrusion line as set forth in claim 25 wherein said carriages support said closures at a common angle.

27. An extrusion line as set forth in claim 24 including a hole in the closure supporting said shaper, said closure supporting the die being adapted to close said hole with the die moving therethrough.

28. An extrusion line as set forth in claim 27 including means to adjust the position of the die with respect to its supporting closure.

29. An extrusion line as set forth in claim 27 including carriage means for each closure, and means to adjust the angular position of each closure with respect to the carriage means.

30. An extrusion line as set forth in claim 29 wherein the angle of adjustment of the closure supporting the shaper is obtained by adjustable struts.

31. An extrusion line as set forth in claim 29 wherein the angle of adjustment of the closure supporting the die is obtained by an adjustable hanger.

* * * * *